United States Patent [19]

Barr et al.

[11] Patent Number: 5,529,672
[45] Date of Patent: Jun. 25, 1996

[54] MINERAL RECOVERY APPARATUS

[75] Inventors: Neal Barr, Brisbane; Robert N. De Denus, Gympie; Patrick A. Treasure, Queensland, all of Australia

[73] Assignee: Material Research Pty. Ltd., Brisbane, Australia

[21] Appl. No.: 104,144

[22] PCT Filed: Feb. 12, 1992

[86] PCT No.: PCT/AU92/00052

§ 371 Date: Apr. 9, 1994

§ 102(e) Date: Apr. 9, 1994

[87] PCT Pub. No.: WO92/14865

PCT Pub. Date: Sep. 3, 1992

[30] Foreign Application Priority Data

Feb. 14, 1991 [AU] Australia .................................. PK4602

[51] Int. Cl.⁶ .................................................... C25C 7/00
[52] U.S. Cl. ............................................ 204/272; 204/278
[58] Field of Search .................................. 204/272, 269, 204/270, 273, 276, 105 R, 109

[56] References Cited

U.S. PATENT DOCUMENTS 4,026,784  5/1977  Rivers .......................... 204/272 X
4,439,300  3/1984  Houseman ........................ 204/272
4,840,717  6/1989  Dzodin .......................... 204/272 X
5,017,273  5/1991  Woog ............................ 204/275 X

FOREIGN PATENT DOCUMENTS 0342969  11/1989  European Pat. Off. ..
1374037  1/1965  France .
2299667  8/1976  France .
717484  2/1942  Germany .
1136122  9/1962  Germany .
55-145189  11/1980  Japan .
916438  1/1963  United Kingdom ................ 204/272
8809399  12/1988  WIPO .

*Primary Examiner*—Donald R. Valentine
*Attorney, Agent, or Firm*—Amster, Rothstein & Ebenstein

[57] ABSTRACT

An electrolytic metal extraction cell (10) is disclosed for the electrowinning of metals from dilute solutions of their salts. A thin-walled tube (12) formed from the metal to be deposited extends between a pair of plastic end caps (13 and 14). The upper and lower end caps (13 and 14) include respective fluid outlet and inlet pipes (22 and 23) having their axes perpendicular to the axis of the tube (12) and tangential to the annular cavity (24) between the tube (12) and a central tubular electrode (21), inducing a spiral or turbulent fluid flow within the annular cavity (24) which promotes even deposition of electrowon material onto the tube (12).

16 Claims, 4 Drawing Sheets

MINERAL RECOVERY APPARATUS

This invention relates to mineral recovery apparatus.

This invention has particular but not exclusive application to the electrowinning of copper from aqueous solution, and for illustrative purposes reference will be made to such application. However, it is to be understood that this invention could be used in other applications, such as the electrowinning of silver or other metals, or the production of gases.

Many methods of extracting metals from ores leave small but significant proportions of the metals in the ore. Other methods cannot be utilised economically on low-grade ores. One established method of extracting residual metals from processed ores, or of extracting metals from low-grade ores, is known as "leaching". Leaching involves passing a fluid in which the metal to be extracted will dissolve through the ore, collecting the leachate, and separating the metal from the leachate. In the case of copper extraction, the leachate typically used is dilute sulphuric acid, which reacts with the copper to produce copper sulphate. The copper may then be removed from the copper sulphate drained from the ore by exposing it to metallic iron or steel, where iron sulphate and free copper are formed.

Unfortunately, the copper so produced contains significant impurities, and the acid is used up in the process, making the economics of the process poor. Alternatively, the copper sulphate solution may be passed through an electrolytic cell, recovering both free copper and sulphuric acid. However, conventional electrolytic cells cannot generally be applied economically to the direct winning of metal from the low-concentration leachates available from mining operations, a further concentration process being required before the leachate can be electrolysed.

The present invention aims to alleviate the above disadvantages and to provide mineral extraction apparatus which will be reliable and efficient in use. Other objects and advantages of this invention will hereinafter become apparent.

With the foregoing and other objects in view, this invention in one aspect resides broadly in a mineral extraction cell assembly for extracting a metal from a flowing solution containing mineral, said cell assembly including:

a stationary elongate housing having a conductive inner surface on which the metal to be harvested is electrodeposited in the form of a shell;

closure assemblies removably mounted to each end of the stationary housing;

an electrode extending from at least one the closure assembly into the housing to form an annular cavity between the housing and the electrode;

a fluid inlet to the annular cavity in one of the closure assemblies and formed whereby, in use, fluid is introduced to the cell assembly offset from the elongate axis of the stationary elongate housing;

a fluid outlet to the cell assembly formed in the other of the closure assemblies, and electrical terminations for connecting an electrical circuit to the electrode and the conductive surface.

Preferably the elongate housing extends between end walls and the electrode is disposed within the housing and extends between said end walls. It is also preferred that the electrode is utilised as an electrical anode and the conductive surface is utilised as a cathode such that mineral material produced by electrolysis of a liquid held within the housing is deposited on the conductive surface. Of course, if desired, the electrode may be utilised as the cathode such that mineral material may be deposited thereon. If desired, the electrode may be formed to include surface treatments such as projections or ribs for promoting turbulent flow in the fluid.

Suitably, the housing includes an elongate cylindrical portion formed from conductive material such that the conductive surface may be integral therewith. The cathode and in particular the conductive material may be chosen to be the same as the mineral to be deposited. For instance, in the electrowinning of copper, the cylindrical portion may take the form of a thin-walled copper tube within which a thick layer of copper may be deposited, and the cylindrical portion may then be replaced with a fresh copper tube. This eliminates the need to carry out the difficult process of stripping the deposited material from the tube.

Alternatively, the conductive material may be chosen such that it differs in its surface properties from the mineral to be electrowon to the extent that the shell of the mineral built up on the conductive material may be conveniently separated therefrom. Suitably, the separated mineral may be in the form of a thin-walled tube which itself may be utilised as a "starter" tube for the deposition of successive layers of the same mineral after its separation from the conductive material. For instance, in the electrowinning of copper, a large number of copper starter tubes for other cells may be produced from a relatively small number of cells using stainless-steel tubes.

The fluid inlet and the fluid outlet may be disposed in any direction relative to the housing, such as parallel to the elongate dimension of the housing. However, it is preferred that the fluid inlet be disposed adjacent to a first end of the housing, aligned substantially perpendicular to the axis of the elongate housing, and/or tangential to the annular cavity formed between the housing and the electrode whereby spiral flow through the annular cavity of the liquor is induced. Such spiral flow is considered to promote even deposition of the electrowon material. Suitably, the fluid outlet is disposed in a similar configuration to the fluid inlet and remote therefrom such that spiral flow of the liquor is further enhanced.

The fluid inlet may be connected to the fluid outlet of a second mineral extraction cell such that fluid may pass in series through both cells, permitting the progressive extraction of minerals from the fluid. An extraction battery may be formed from a plurality of cells connected in series such that mineral extraction may occur from a given volume of fluid over a sustained time period whereby a significant proportion of the total initial concentration of the desired mineral may be extracted.

Where the extraction process results in the generation of gaseous by-products, gas separation apparatus may be interposed between cells such that gas generated in an upstream cell may be removed from the liquid by differential density techniques or the like before entering a downstream cell. Alternatively or additionally, the upper ends of the cells may be provided with vent openings whereby generated gas may be vented from a cell before the liquid passes to a downstream cell. The gaseous separation effect may be enhanced by providing a gas separation chamber above the liquid outlet. Suitably, for the desired level of effectiveness, the separation chamber should be approximately the same diameter as the outside diameter of the annular cavity, and have a minimum height equal to half of that diameter.

It is envisaged that the cell may be adapted for the electrowinning of minerals in particulate form by arranging the operating conditions of a cell, including fluid velocity and cathode current density, within desired limits such at least some of the electrowon material, instead of being deposited onto the cathode is carried through the cell with the liquid flow such that it may be collected at a convenient collection point remote from the cylindrical portion of the housing. In this embodiment, the electro-deposited shell is a friable shell which is eroded by the flowing solution. The cell may be provided with metal particulate collection means such that at least some of the electrowon material may be extracted from the cell as particles with mineral interruption to the electrowinning process. Additionally or alternatively, the particulate collection means may be interposed between cells connected in series, and may be formed integrally with gas separation means. The particulate collection means may include separation means utilising gravitational effects or centrifugal effects for separation and a collection chamber or hopper. The latter may be selectively connectible to an external collection region by external valve means, and the collection chamber may itself be selectively isolated from the cell or collection chamber by further valve means such that particulate material may be extracted by permitting it to fall through the open further valve means into the collection chamber with the external valve means closed, then closing the further valve means and opening the external valve means.

In a further embodiment, the collection means may include a collection chamber moveable between a collection location beneath a cell or separation chamber and a discharge location remote from the cell or separation chamber. Suitably, a plurality of collection chambers are provided, and are arranged around a rotary magazine, the latter being rotatable such that collection chambers may be moved between the collection location and a discharge location.

In another aspect, this invention resides in a method of electrowinning a mineral, including:

providing mineral extraction apparatus including an elongate housing having a conductive surface disposed about the internal periphery thereof, an elongate electrode disposed within said housing, a fluid inlet to said housing, a fluid outlet from said housing remote from said fluid inlet, and a pair of electrical terminations for connecting an electrical circuit to said electrode and said conductive circuit;

connecting a source of electric current between said conductive surface and said electrode; and, passing a fluid containing a dissolved salt of the mineral through said housing between said fluid inlet and said fluid outlet.

The method may further include the addition of a leaching process to the electrowinning process, the fluid containing fine ore particles including the metal to be electrowon, such that the process of dissolving the metal particles may be carried out concurrently with the electrowinning process, rather than requiring the two separate steps of leaching and electrowinning. For instance, in the electrowinning of copper from its ores, finely-crushed ore may be introduced into a dilute solution of sulphuric acid passing through a cell or plurality of cells. The copper dissolves in the acid and is then electrowon from solution, being deposited on the tube wall, during which the sulphuric acid is regenerated. The remainder of the ore is not dissolved, and may be separated from the liquid by settling, filtration or centrifugal effects.

In order that this invention may be more easily understood and put into practical effect, reference will now be made to the accompanying drawings which illustrate a preferred embodiment of the invention, wherein.

Figure 1:
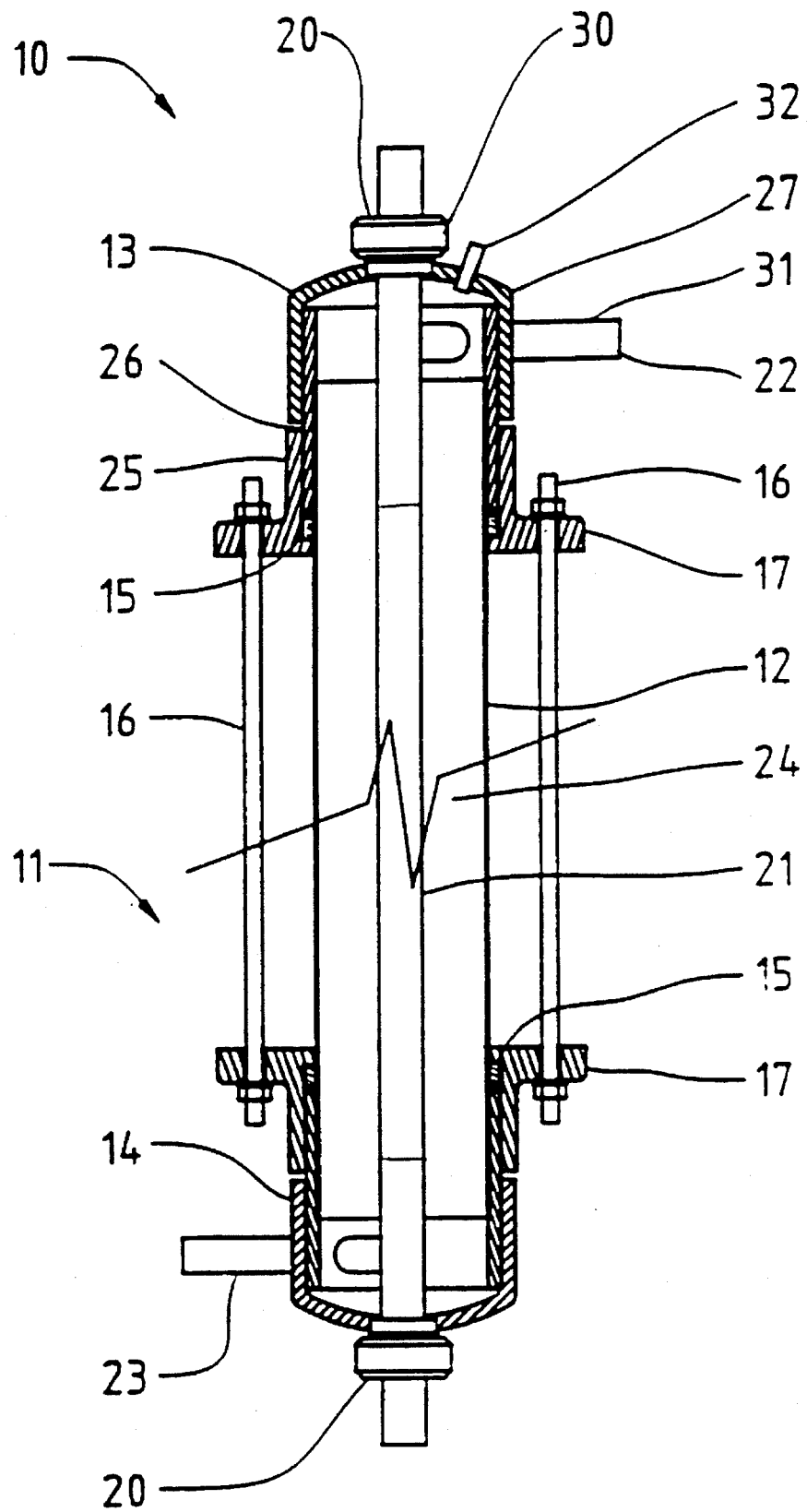
FIG. 1 is a cross-sectional side view of an electrolytic cell according to the invention.
Figure 2:
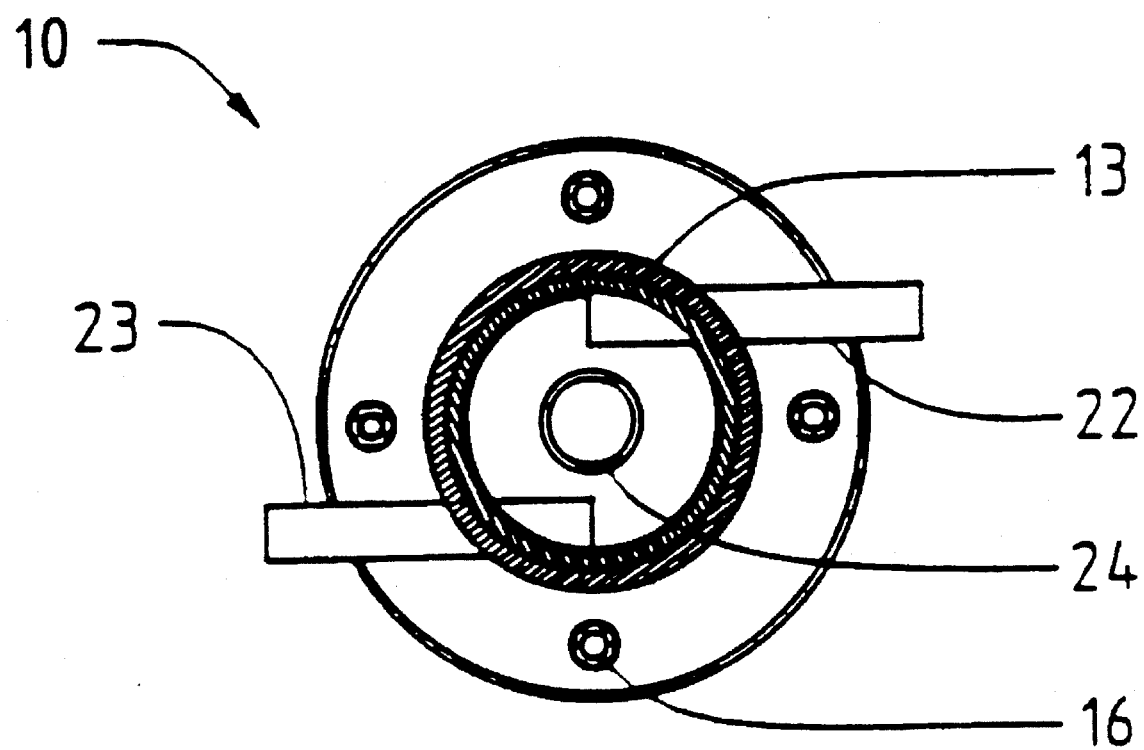
FIG. 2 is a cross-sectional plan view of the electrolytic cell shown in FIG. 1.

The electrolytic cell 10 shown in FIGS. 1 and 2 includes a housing assembly 11 which comprises a metal tube 12 to the external periphery of which an upper end cap 13 and a lower end cap 14 are sealed by sealing rings 15. The housing assembly 11 is held together by through bolts 16 which are clamped to flanges 17 formed in the end caps 13 and 14.

Sealing glands 20 are formed centrally in the end caps 13 and 14, and a cylindrical electrode 21 passes through them. If desired, only one sealing gland may be provided, and the electrode 21 may be terminated at its other end around a boss or within a tubular recess projecting inward from an end cap, the tubular electrode 21 being sealed to the boss or recess by sealing means, or otherwise blocked to minimised loss of fluid through the electrode 21. A liquid outlet 22 is formed in the upper end cap 13, and a liquid inlet 23 is formed in the lower end cap 14. The outlet 22 and the inlet 23 are aligned with their axes perpendicular to the axis of the housing assembly 11 and tangential to the annular cavity 24 formed between the housing assembly 11 and the electrode 21. The upward flow of liquid induced by locating the inlet 23 in the lower end cap 14 will tend to scour gas deposited on the electrode 21 upwards towards a gas vent 32 formed in the upper end cap 13, and the gas flow acts as a bubble pump to enhance the flow of liquid and reduce external pumping requirements. Of course, if desired, the inlet 23 could be formed in the upper end cap 13 and the outlet 22 in the lower end cap 14 to induce downward liquid flow.

In the region between the inlet 22 and the lower end of the tube 12, the inner diameter of the lower end cap 14 is formed to match closely the inside diameter of the tube 12 such that a relatively smooth cylindrical surface is provided to enhance spiral flow of the incoming liquid. The same process of diameter-matching is applied to the upper end cap 13 and the tube 12 for further enhancement of smooth spiral flow within the annular cavity 24.

Each of the end caps 13 and 14 is formed from an assembly of PVC plastic pipe fittings, including a flange adaptor 25, a length of pipe 26, a pipe cap 27, a compression fitting 30 and a further length of smaller-diameter pipe 31, these components being welded or glued together. Of course, if desired, the end caps could be formed integrally by a plastics moulding process. If desired, the gas vent 32 may be provided with a float valve or the like which opens when gas has collected within the upper end cap 13, and closes after the gas has been vented.

Where it is desired to win electrolytic copper from a liquor containing sulphuric acid and copper sulphate, a copper tube may be utilised as the metal tube 12, and the tubular electrode 21 may be formed from titanium with a surface coating of precious metal oxides (known as dimensionally-stably anodes), or other materials which are insoluble in acid and non-passivating under operating conditions, such as lead/antimony alloys. Alternatively, the metal tube 12 may be formed from an inert material such as stainless steel from which the deposited material may be readily removed.

In use, a source of DC electric power is connected to the cell 10 with its positive terminal joined to the tubular electrode 21, which becomes the anode, and its negative terminal joined to the metal tube 12, which becomes the cathode, clip-on connectors being preferred for this purpose to facilitate ease of assembly and disassembly and particularly removal and replacement of the housing 12. Current passing between the electrode 21 and the tube 12 deposits copper on the latter, and oxygen released from solution by the process is vented to atmosphere through the gas vent 32. When a desired thickness of copper has built up on the inside of the tube 12, it may be removed for sale as refined copper, or for such uses as electrical bus bars, and replaced with a fresh tube.

If desired, an array of cells 10 may be built up, and the liquor may be pumped through a plurality of cells in series, such that the copper content of the liquor is progressively reduced. Of course, any desired configuration of series and parallel flow between an array of cells may be configured such that flow conditions in the cells are optimised. Similarly, the electrical supply to the cells may be arranged in any desired series, parallel or series/parallel configuration to match cell currents and voltages to the available power supply.

Figure 3:
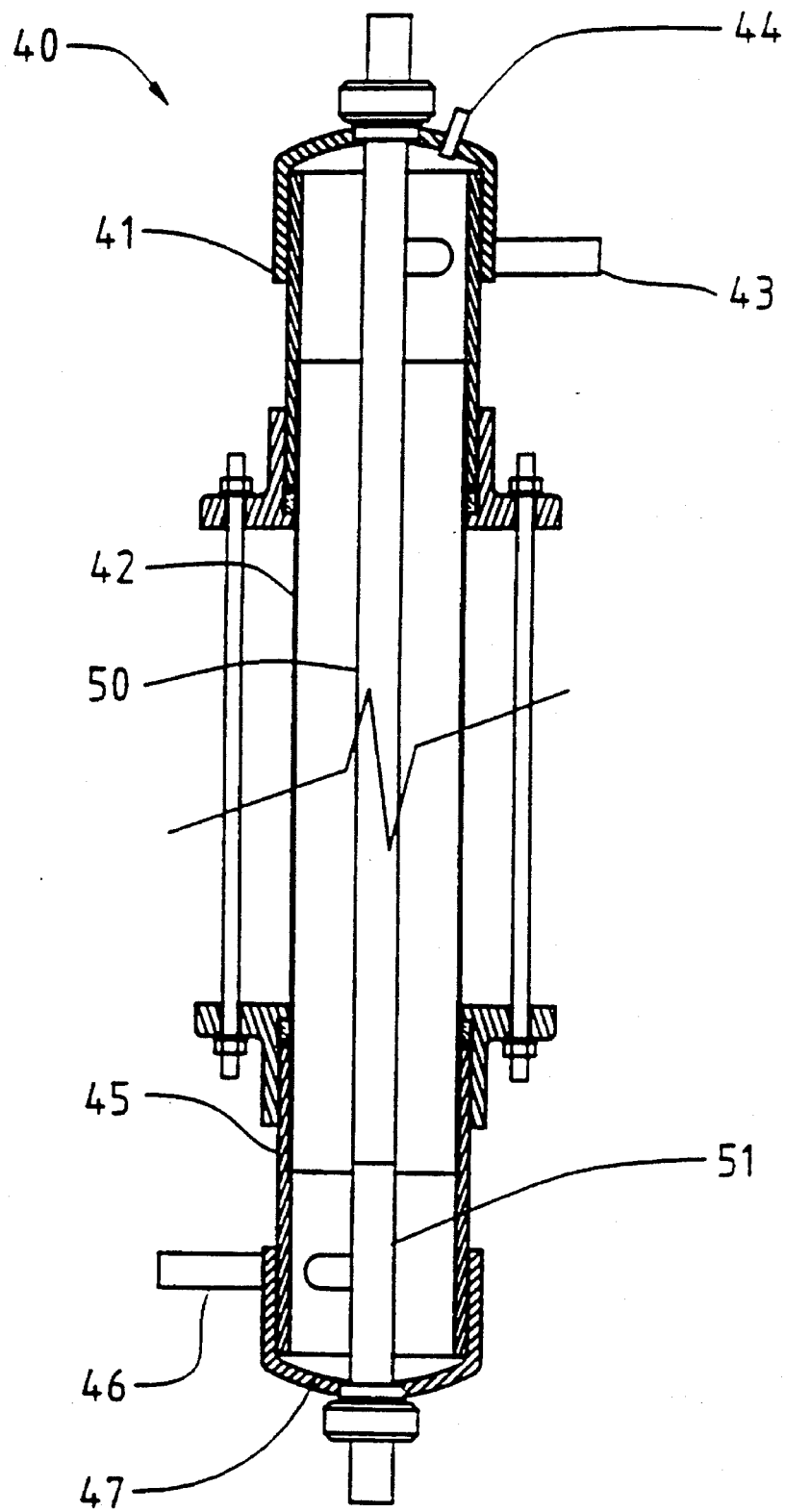
FIG. 3 is a cross-sectional side view of a further embodiment of the invention.

The electrolytic cell 40 shown in FIG. 3 is similar in construction to that shown in FIGS. 1 and 2, but in the upper end cap 41, a vertical gap greater than one-half of the internal diameter of the tube 42 is left between the top of the liquid outlet 43 and the gas vent 44 such that gas entrained in the fluid rising through the tube 42 may separate from the liquid before the latter passes out of the cell 40. The lower end cap 45 is also formed with a vertical gap greater than one-half of the internal diameter of the tube 42 between the bottom of the liquid inlet 46 and the base 47 of the lower end cap 45. The anode 50 terminates above the liquid inlet 46, but its cylindrical shape is continued downward beyond the liquid inlet 46 by means of a non-conducting anode mount 51 attached to the base 47 such that the inlet flow pattern is not significantly disturbed. These features ensure that a moderate buildup of metal particles falling to the bottom of the cell 40 neither impedes the flow of liquid through the inlet 46 nor creates and electrical short between the anode 50 and the tube 42.

The circumferential joint between the lower end cap 45 and the lower end of the tube 42 is also placed at least one-half of the inside diameter of the tube 42 above the top of the inlet 46 such that erosion of the end of the tube 42 in the turbulent flow conditions near the inlet may be minimised. The circumferential joint between the upper end cap 41 and the upper end of the tube 42 is configured in a similar manner such that smoothness of the spiral exit flow is enhanced and such that erosion of the upper end of the tube 42 is minimised.

Figure 4:
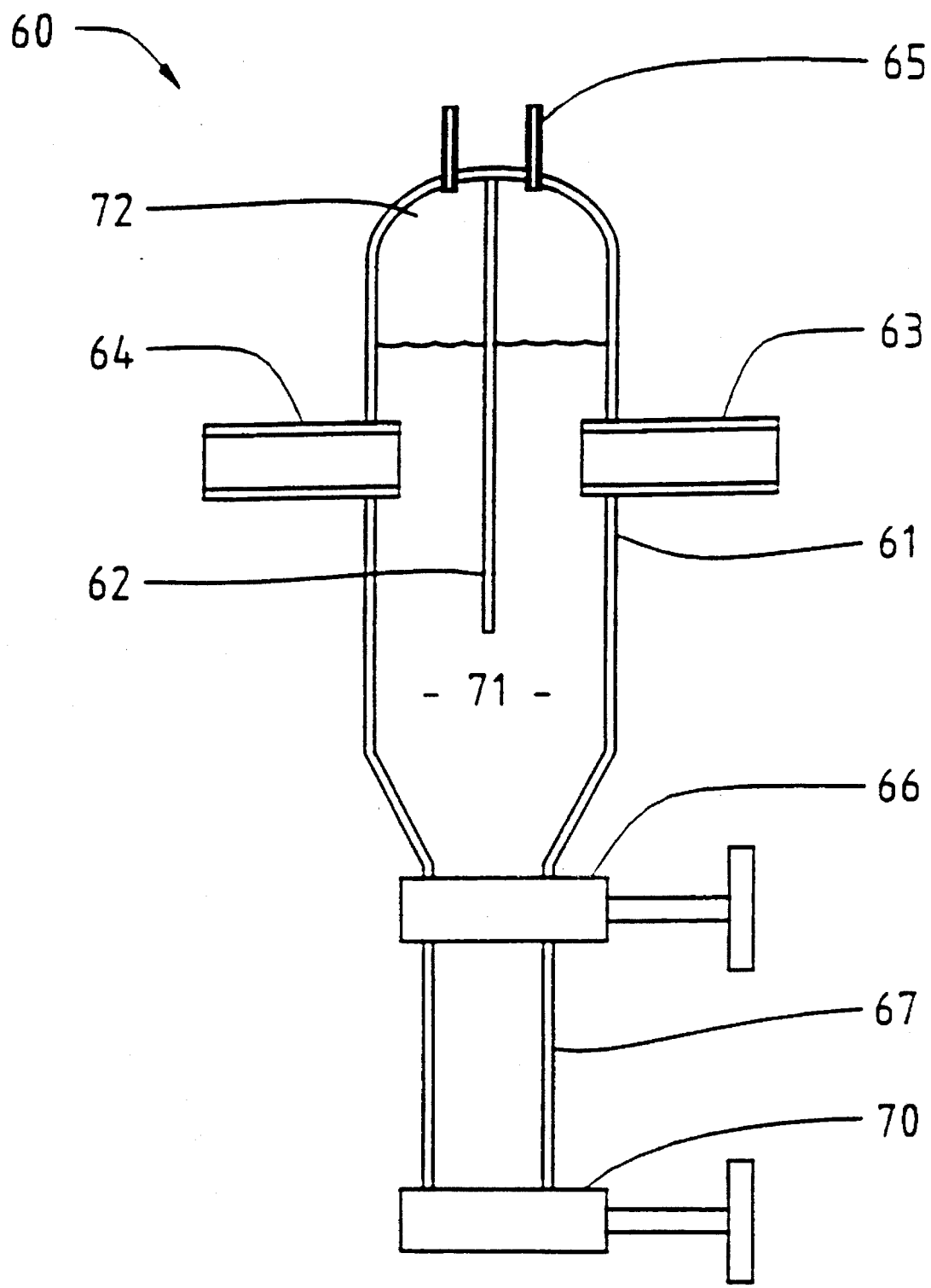
FIG. 4 is a cross-sectional side view of a separation apparatus according to the invention.

The separation apparatus 60 illustrated in FIG. 4 is utilized to recover mineral particles formed in the cell 10 but not deposited on the cathode and for this purpose includes a vertical tubular separation chamber 61 closed at its top end and separated into two parts by a vertical baffle 62, the latter separating the inlet pipe 63 from the outlet pipe 64. Gas vents 65, which may include float valves if desired, are formed in the upper portion of the separation chamber 61. At its lower end, the separation chamber 61 tapers inward conically and terminates in an upper valve 66, the lower face of which a tubular collection chamber 67 is attached. The latter is terminated at its lower end by a lower valve 70.

In use, liquor carrying gas bubbles and metal particles may enter the separation apparatus 60 from the liquid outlet 22 of a cell 10 through the inlet pipe 63. The volume of the separation chamber 61 is made many times the volume of the volume of a cell 10 such that the liquor will have a relatively long retention time within the separation chamber 61. The baffle 62 prevents the short-circuiting of liquor flow directly from inlet 63 to outlet 64. Gas rises out of the liquor 71 and escapes through the gas vents 65, while metal particles fall through the liquor 71 and the open upper valve 66 into the collection chamber 67, resting on the closed lower valve 70.

When it is desired to collect the accumulated metal particles, the upper valve 66 is closed, allowing the pressurised liquor flow loop to continue in operation while the lower valve 70 is opened to allow the metal particles to drop out. If desired sensing electrodes may be placed in spaced relationship along the side wall of the collection chamber 67, and remote sensing means, such as a resistance meter, may be utilised to sense when the level of metal particles has reached the desired level for collection.

It will of course be realised that while the above has been given by way of illustrative example of this invention, all such and other modifications and variations thereto as would be apparent to persons skilled in the art are deemed to fall within the broad scope and ambit of this invention as is defined in the appended claims.

We claim:

1. A dismantable mineral extraction cell assembly suitable for extracting a metal from a flowing leach solution containing mineral, said cell assembly including:

a stationary elongate housing having a conductive inner surface forming a cathode on which the metal to be harvested is electro-deposited in the form of a shell, and an elongate axis;

non-metallic closure assemblies removably mounted to each end of said stationary housing;

a circumferentially continuous electrode forming an anode assembly extending through said housing and co-axial therewith to form an annular cavity between said housing and said electrode;

said anode assembly extending to each said closure assembly for support thereby and passing through at least one said closure assembly to provide an external electrical termination for connecting said anode assembly to an electrical circuit;

a fluid inlet for supplying exclusively unprocessed electrolyte to said annular cavity in one of said closure assemblies and formed whereby, in use, fluid is introduced to cell assembly tangentially to an elongate axis of said stationary elongate housing;

a fluid outlet in said cell assembly formed in the other of said closure assemblies from which processed electrolyte is exclusively removed a gas outlet in one of said cell enclosures for enabling the escape of gas therefrom; and an electrical termination for connecting the electrical circuit to said cathode.

2. A cell assembly as claimed in claim 1, wherein said conductive surface is composed of the same material as the metal to be deposited.

3. A cell assembly as claimed in claim 1, wherein said conductive surface is chosen such that it differs in surface properties from the metal to be deposited.

4. A cell assembly as claimed in claim 1, wherein said closure assembly is an end cap slideably engageable over a respective end of said housing and adapted to be electrically isolated from said conductive surface.

5. A cell assembly as claimed in claim 1, wherein said fluid inlet and said fluid outlet are aligned substantially tangentially to said annular cavity.

6. Mineral extraction apparatus including a plurality of mineral extraction cell assemblies as claimed in claim 1, said cell assemblies being operatively connected in series.

7. A dismantable mineral extraction cell assembly as claimed in claim 1, wherein said elongate axis of said housing is disposed vertically and either or both said anode and/or cathode terminate above said fluid inlet or said outlet disposed at the lower end of said housing.

8. A dismantable mineral extraction cell assembly for extracting a metal from a flowing solution containing mineral, said cell assembly including:

a stationary elongate housing having a conductive inner surface forming a cathode on which the metal to be harvested is electro-deposited in the form of a shell, and an elongate axis;

closure assemblies removably mounted to each end of said stationary housing;

an electrode forming an anode extending between and supported by said closure assemblies through said housing to form an annular cavity between said housing and said electrode;

a fluid inlet for supplying exclusively unprocessed electrolyte to said annular cavity in one of said closure assemblies and formed whereby, in use, fluid is introduced to said cell assembly tangentially to an elongate axis of said stationary elongate housing;

a fluid outlet to said cell assembly formed in the other of said closure assemblies from which processed electrolyte is exclusively removed; and electrical terminations for connecting an electrical circuit to said electrode and said conductive surface;

said conductive surface and non-conductive extensions extending beyond said fluid inlet and said fluid outlet coplanar with said electrode.

9. Mineral extraction apparatus including a plurality of mineral extraction cell assemblies operatively connected in series, each said cell assembly including:

a stationary elongate housing having a conductive inner surface forming a cathode on which the metal to be harvested is electro-deposited in the form of a shell, and an elongate axis;

non-metallic closure assemblies removably mounted to each end of said stationary housing;

an electrode forming an anode assembly extending through said housing and co-axial therewith to form an annular cavity between said housing and said electrode;

said anode assembly extending to each said closure assembly for support thereby and passing through at least one said closure assembly to provide an external electrical termination for connecting said anode assembly to an electrical circuit;

a fluid inlet for supplying exclusively unprocessed electrolyte to said annular cavity in one of said closure assemblies and formed whereby, in use, fluid is introduced to cell assembly tangentially to an elongate axis of said stationary elongate housing;

a fluid outlet in said cell assembly formed in the other of said closure assemblies from which processed electrolyte is exclusively removed;

an electrical termination for connecting the electrical circuit to said cathode; and including gas separation apparatus interposed between adjacent cell assemblies.

10. Mineral extraction apparatus including a plurality of mineral extraction cell assemblies operatively connected in series, each said cell assembly including:

a stationary elongate housing having a conductive inner surface forming a cathode on which the metal to be harvested is electro-deposited in the form of a shell, and an elongate axis;

non-metallic closure assemblies removably mounted to each end of said stationary housing;

an electrode forming an anode assembly extending through said housing and co-axial therewith to form an annular cavity between said housing and said electrode;

said anode assembly extending to each said closure assembly for support thereby and passing through at least one said closure assembly to provide an external electrical termination for connecting said anode assembly to an electrical circuit;

a fluid inlet for supplying exclusively unprocessed electrolyte to said annular cavity in one of said closure assemblies and formed whereby, in use, fluid is introduced to cell assembly tangentially to an elongate axis of said stationary elongate housing;

a fluid outlet in said cell assembly formed in the other of said closure assemblies from which processed electrolyte is exclusively removed;

an electrical termination for connecting the electrical circuit to said cathode; and wherein said shell is a friable shell which may be eroded by said flowing solution whereby electro-deposited material is carried out of the or each said cell assembly in the form of particulates of metal by said flowing solution.

11. Mineral extraction apparatus as claimed in claim 10, including particulate collection means interposed between adjacent cells.

12. A method of electrowinning a metal from a mineral, including:

(A) providing a mineral extraction cell assembly including a stationary elongate housing having a conductive inner surface by which the metal may be electro-deposited, a non-metallic closure assembly removably mounted on each end of the housing, an electrode extending into said housing to form an annular cavity between said housing and said electrode, said electrode extending between and being supported by said closure assemblies, a fluid inlet to said cell assembly tangential to said annular cavity and remote from said housing, a fluid outlet to said cell assembly tangential to said annular cavity and remote from said housing, and electrical terminations for connecting an electrical circuit to said electrode and said conductive surface;

(B) passing a fluid containing a dissolved salt of the metal through said housing between said fluid inlet and said fluid outlet; and (C) connecting a source of electric current between said conductive surface and said electrode;

whereby metal to be electrowon may be deposited on the conductive surface or in said annular cavity.

13. A method as claimed in claim 12 wherein the metal to be electrowon is deposited to form a shell on the conductive surface.

14. A method as claimed in claim 12 including recovering the metal from the mineral extraction apparatus by removing the conductive surface with the metal deposited thereon and replacing the conductive surface with another conductive surface composed of the same material as the metal to be deposited.

15. A method as claimed in claim 14 including removing the mineral to be electrowon from mineral extraction apparatus by flow of said fluid therethrough.

16. The method of claim 12 wherein said electrode also extends through at least one of said closure assemblies.

* * * * *